(12) United States Patent
Egal et al.

(10) Patent No.: US 10,344,855 B2
(45) Date of Patent: Jul. 9, 2019

(54) CVT VARIATOR GROSS SLIP DETECTION

(71) Applicant: GM GLOBAL TECHNOLOGY OPERATIONS LLC, Detroit, MI (US)

(72) Inventors: Mohamed O Egal, Ann Arbor, MI (US); Paul G Otanez, Franklin, MI (US); Mateusz M Nowak, Dearborn, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 149 days.

(21) Appl. No.: 15/592,813

(22) Filed: May 11, 2017

(65) Prior Publication Data

US 2018/0328485 A1 Nov. 15, 2018

(51) Int. Cl.
*F16H 61/662* (2006.01)
*F16H 59/46* (2006.01)
*F16H 59/14* (2006.01)

(52) U.S. Cl.
CPC ....... *F16H 61/66272* (2013.01); *F16H 59/46* (2013.01); *F16H 59/14* (2013.01); *F16H 2059/465* (2013.01); *F16H 2061/6629* (2013.01)

(58) Field of Classification Search
CPC .... F16H 59/14; F16H 59/46; F16H 2059/465; F16H 61/66272
See application file for complete search history.

(56) References Cited

U.S. PATENT DOCUMENTS

| | | | | |
|---|---|---|---|---|
| 2007/0287589 | A1* | 12/2007 | Kadono | B60W 10/06 477/110 |
| 2010/0198467 | A1* | 8/2010 | Van Der Noll | F16H 61/66272 701/51 |
| 2012/0252612 | A1* | 10/2012 | Kodama | F16H 61/66272 474/69 |
| 2012/0259521 | A1* | 10/2012 | Totsuka | F16H 61/66272 701/58 |
| 2014/0162815 | A1* | 6/2014 | Natori | F16H 61/66259 474/11 |

\* cited by examiner

*Primary Examiner* — Edwin A Young

(57) ABSTRACT

A continuously variable transmission (CVT) and a method is provided for CVT variator gross slip detection includes determining if a difference between a commanded variator speed ratio and a real variator speed ratio is greater than a predetermined variator speed ratio threshold, and then determining if a variator rate of change ratio is outside of predetermined variator rate of change ratio limits. Further, the method includes determining if a real torque capacity ratio is greater than a predetermined torque capacity ratio threshold, and performing at least one remedial action when the variator rate of change ratio is outside of predetermined variator rate of change ratio limits, and the real torque capacity ratio is greater than the predetermined torque capacity ratio threshold when the difference between the commanded variator speed ratio and the real variator speed ratio is greater than the predetermined variator speed ratio threshold.

14 Claims, 3 Drawing Sheets

CVT VARIATOR GROSS SLIP DETECTION

TECHNICAL FIELD

The present disclosure pertains to a propulsion system having continuously variable transmission (CVT), and more particularly, a method for CVT variator gross slip detection.

INTRODUCTION

A continuously variable transmission (CVT) is a type of power transmission that is capable of continuously changing an output/input speed ratio over a range between a minimum (underdrive) ratio and a maximum (overdrive) ratio, thus permitting an infinitely variable selection of engine operation that can achieve a preferred balance of fuel consumption and engine performance in response to an output torque request. Unlike conventionally-geared transmissions that use one or more planetary gear sets and multiple rotating and braking friction clutches to establish a discrete gear state, a CVT uses a variable-diameter pulley system to achieve the infinitely variable selection of gear ratios.

The pulley system, which is commonly referred to as a variator assembly, can transition anywhere within a calibrated range of speed ratios. A typical belt-type or chain-type variator assembly includes two variator pulleys interconnected via an endless rotatable drive element, such as a drive chain or belt. The endless rotatable drive element rides within a variable-width gap defined by conical pulley faces. One of the variator pulleys receives engine torque via a crankshaft, torque converter, and an input gear set, and thus acts as a driving/primary pulley. The other pulley is connected via additional gear sets to an output shaft of the CVT and thus acts as a driven/secondary pulley.

In order to vary a CVT speed ratio and to transfer torque to the drivetrain, a clamping force (applied through hydraulic pressure) may be applied to one or both of the variator pulleys via one or more pulley actuators. The clamping force effectively squeezes the pulley halves together to change the width of the gap between pulley faces. Variation of the gap size, i.e., the pitch radius, causes the rotatable drive element to ride higher or lower within the gap. This, in turn, changes the effective diameters of the variator pulleys and may vary the speed ratio of the CVT.

In some instances during a transference of torque operation to the drivetrain, the output variator speed (torque) ratio delivered to the drivetrain may lag the input variator speed (torque) ratio due to inherent variator system hydraulic pressure latency characteristics. This difference in the input and output variator speed ratios caused by the pressure response lag can cause gross slip errors to be falsely triggered which in turn could lead to unnecessary clamping events causing reduced fuel economy. Other factors that can lead to false triggers include system parameter uncertainties, feedback system characteristics, uncertainty in measured torque, road and other disturbances. To this end, it is desirable to have a reliable means for CVT variator gross slip detection to mitigate false gross slip errors due to pressure latency.

SUMMARY

The present disclosure provides a method for CVT variator gross slip detection to mitigate false gross slip errors. In accordance with aspects of an exemplary embodiment, a method for CVT variator gross slip detection includes determining if a difference between a commanded variator speed ratio and a real variator speed ratio is greater than a predetermined variator speed ratio threshold. Another aspect of the exemplary embodiment includes determining if a variator rate of change ratio is outside of predetermined variator rate of change ratio limits when the difference between the commanded variator speed ratio and the real variator speed ratio is greater than the predetermined variator speed ratio threshold.

And another aspect includes determining if a real torque capacity ratio is greater than a predetermined torque capacity ratio threshold when the difference between the commanded variator speed ratio and the real variator speed ratio is greater than the predetermined variator speed ratio threshold. And still another aspect includes performing at least one remedial action when the variator rate of change ratio is outside of predetermined variator rate of change ratio limits, and the real torque capacity ratio is greater than the predetermined torque capacity ratio threshold when the difference between the commanded variator speed ratio and the real variator speed ratio is greater than the predetermined variator speed ratio threshold.

A further aspect in accordance with the exemplary embodiment includes determining if transmission line pressure is low prior to determining if the variator rate of change ratio is outside of predetermined variator rate of change ratio limits. Another aspect includes determining if the real torque capacity ratio signal is valid prior to determining if the real torque capacity ratio is greater than the predetermined torque ratio threshold. And another aspect includes performing at least one remedial action when the transmission line pressure is low and the real torque capacity ratio is greater than a predetermined torque capacity ratio threshold. Still another aspect wherein performing at least one remedial action includes setting a fault code for gross slip. And yet another aspect wherein performing comprises adjusting variator clamping to eliminate gross slip.

Another aspect of the exemplary embodiment wherein determining if the difference between the commanded variator speed ratio and the real variator speed ratio is greater than a predetermined variator speed ratio threshold further includes using a CVT variator input speed sensor and a variator output speed sensor. And another aspect wherein using a CVT variator input speed sensor and a variator output speed sensor further comprises using Hall Effect sensors.

Still another aspect wherein determining if the variator rate of change ratio is outside of predetermined variator rate of change ratio limits further includes determining if the variator rate of change ratio is less than a predetermined rate of change ratio minimum threshold or greater than a predetermined rate of change ratio maximum threshold.

And one other aspect includes waiting until a predetermined time period has expired prior to performing the at least one remedial action when the variator rate of change ratio is outside of predetermined variator rate of change ratio limits, and the real torque capacity ratio is greater than a predetermined torque capacity ratio threshold when the difference between the commanded variator speed ratio and the real variator speed ratio is greater than the predetermined variator speed ratio threshold. And yet another aspect includes calculating the real torque capacity ratio based on engine torque and variator clamping torque capacity.

Further aspects, advantages and areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
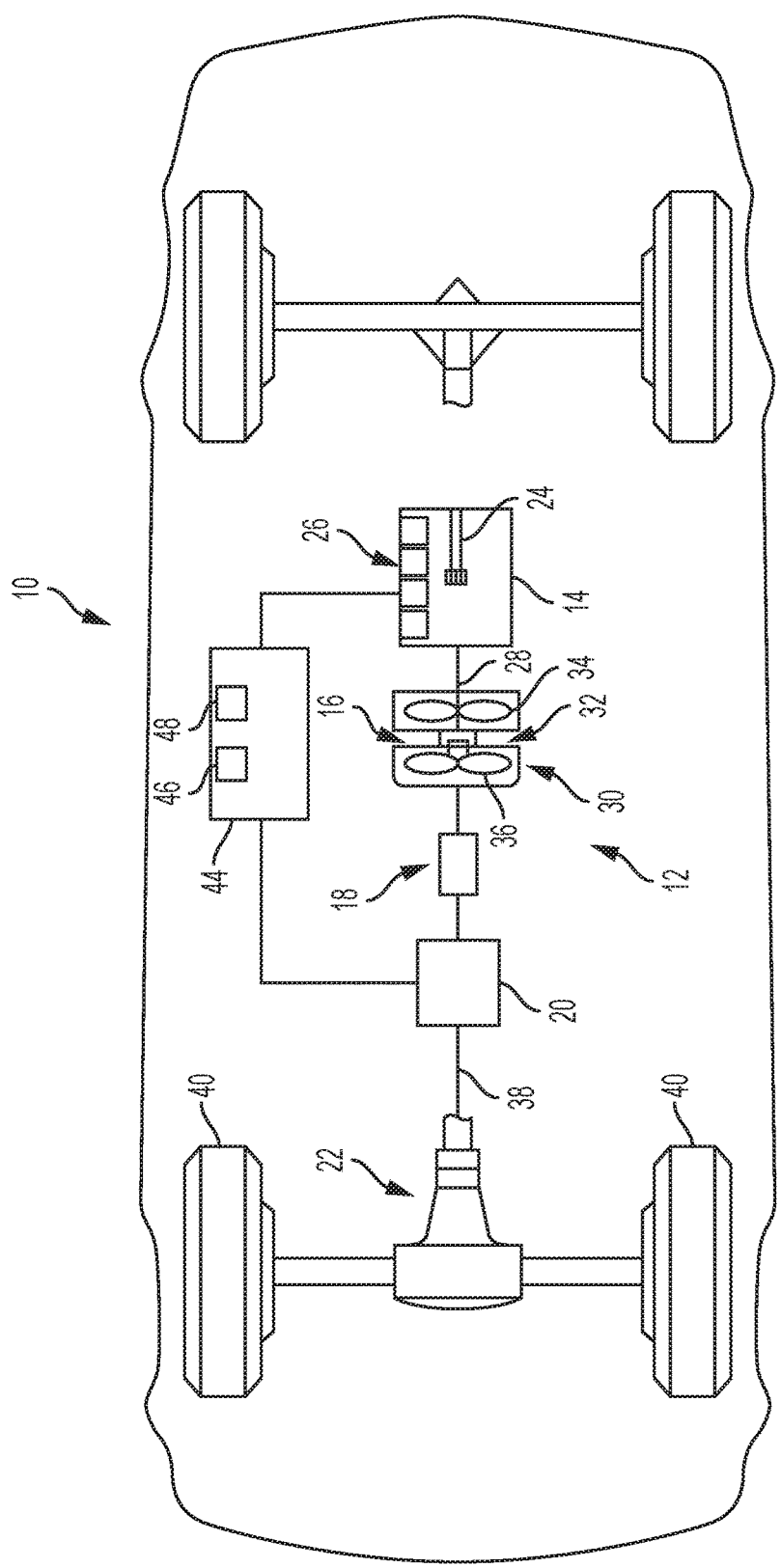
FIG. 1 is a schematic plan view of a motor vehicle including a propulsion system, in accordance with the exemplary embodiment.

Reference will now be made in detail to several examples of the disclosure that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These and similar to directional terms are not to be construed to limit the scope of the disclosure in any manner.

Referring now to the drawings, wherein like reference numbers correspond to like or similar components throughout the several figures, FIG. 1 schematically illustrates a motor vehicle generally designated at 10. The motor vehicle 10 may be any type of vehicle, such as a car, truck, van, sport-utility vehicle, etc.

The motor vehicle 10 includes a propulsion system 12 configured to power the motor vehicle 10. The propulsion system 12 may include an engine 14, a torque converter coupling 16, a forward drive clutch or switching mechanism 18, a continuously variable transmission (CVT) 20, and a final drive assembly 22. The engine 14 could be an internal combustion engine, an electric engine, or a hybrid, by way of example. The engine 14 is operable to power the motor vehicle 10 and includes a crankshaft 24 configured to rotate to move a plurality of pistons (not shown) within a plurality of piston cylinders 26. The crankshaft 24 is configured to move each of the pistons within its own respective cylinder 26, however, an output clutch between the CVT 20 and the final drive assembly 22 could also be used.

Although the engine 14 is depicted as including four cylinders 26, the engine 14 may include any desired number of cylinders 26, such as two, three, four, six, or eight, by way of example. Each cylinder 26 is configured to undergo a combustion event to power the motor vehicle 10. The engine 14 has an engine output shaft 28 configured to transfer torque to the torque converter coupling 16.

The torque converter coupling 16 is connected to the engine output shaft 28 and includes a torque converter 30 and a torque converter lockup clutch 32. The torque converter 30 has an impeller (or pump) 34 and a turbine 36, which are typically separated by a stator (not shown). The impeller 34 is fixed to the engine output shaft 28. The impeller 34 is configured to form a fluid coupling with the turbine 36 under certain conditions, as is known in the art. The torque converter lockup clutch 32 is configured to selectively increase the torque-transmitting capacity between the impeller 34 and the turbine 36 to transmit torque and rotation between the impeller 34 and the turbine 36.

The turbine 36 is connected to the forward drive coupling/switching device 18, which may include a friction clutch, a binary clutch, or a Sprague type device, by way of example. The forward drive coupling/switching device 18 couples the engine 14 and CVT 20 in a forward direction. The CVT 20 is configured to selectively change a gear ratio between the engine output shaft 28 and a transmission output shaft 38. The forward drive coupling/switching device 18 is configured to selectively connect the turbine 36 to the CVT 20. The CVT 20 is interconnected with the final drive unit 22 to propel a set of wheels 40 of the motor vehicle 10. Although referred to generally as a CVT 20, the CVT 20 may be a continuously variable transmission, or an infinitely variable transmission, by way of example.

A control system 44 may be used to control the engine 14 and/or the CVT 20. In some variations, the control system 44 includes an engine control module 46 and a transmission control module 48, by way of example. The engine 14 and the CVT 20 may be equipped with a plurality of actuators and sensing devices for monitoring operation, and in the case of the engine 14, for delivering fuel to form a combustion charge to produce torque that is responsive to an operator torque request. The sensors associated with the engine 14 or CVT 20 may be configured to provide feedback to the control system 44.

Figure 2:
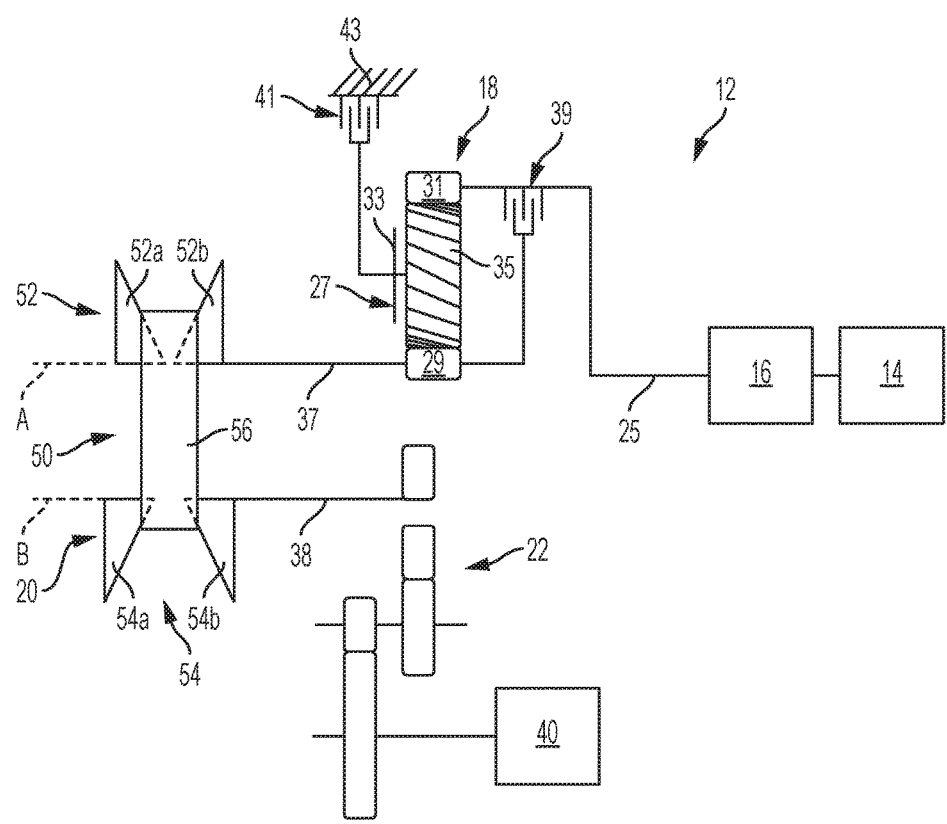
FIG. 2 is a schematic diagrammatic illustration of the motor vehicle propulsion system of FIG. 1 that shows an automotive engine rotatably coupled to a continuously variable transmission (CVT), in accordance with the exemplary embodiment.

Referring now to FIG. 2, additional details of the propulsion system 12 including the CVT 20 are illustrated. The engine 14, torque converter coupling 16, final drive assembly 22, and wheels 40 are schematically illustrated, and any description above with respect to these elements shown in FIG. 1 applies equally here. A gearbox (not shown) may also be included upline or downline of the CVT 20 for additional gearing options.

The output member 25 of the torque converter coupling 16 rotatably couples to the forward-reverse switching mechanism 18 and serves as an input to the CVT 20. The forward-reverse switching mechanism 18 is provided because the engine 12 is operated in a predetermined single direction. The forward-reverse switching mechanism 18 may be provided in a number of different configurations, without falling beyond the spirit and scope of the present disclosure. In the specific example of FIG. 2, the forward-reverse switching mechanism 18 includes a simple planetary gear set 27 including a sun gear 29, a ring gear 31 disposed coaxially about the sun gear 29, and a carrier 33 bearing a plurality of pinion gears 35 that mesh with both the sun gear 29 and the ring gear 31. In other variations, a double-pinion planetary gear set could be used, having one set of pinion gears meshing with a second set of pinion gears, the first set of pinion gears meshing with the sun gear 29 and the second set of pinion gears meshing with the ring gear 31, or simply a type of forward drive clutch could be used. The output member 25 of the torque converter coupling 16 is continuously connected to the ring gear 31, and an input member 37 to the CVT 20 is continuously connected to the sun gear member 29, in this example.

The forward-reverse switching mechanism 18 further includes a forward clutch 39 and a reverse brake 41. The forward clutch 39 is selectively engageable to connect the sun gear 29 and CVT input member 37 to the ring gear 31 and the torque converter output member 25 so that these elements rotate together as a single unit. Accordingly, the engine 14 is then operable to drive the CVT 20 in a forward direction. The reverse brake 41 is selectively engageable to connect the carrier member 33 with a stationary member, such as the transmission housing 43, so that the direction of the input rotation would then be reversed, as applied to the CVT input member 37. It should be understood, however, that the torque converter output member 25 and CVT input member 37, as well as the reverse brake 41 and the forward clutch 39, could be interconnected in a different manner and still achieve forward-reverse switching, without falling beyond the spirit and scope of the present disclosure. For example, other power flows to alternate between forward and reverse could be used, such as alternative configurations using two or three clutches and/or one, two, or more gear sets. The forward clutch 39 and reverse brake 41 may each be controlled by an actuator, such as a hydraulically controlled actuator, that supplies fluid pressure to the clutch 39 or brake 41.

In this example, the CVT 20 is a belt-type or chain-type CVT that may be advantageously controlled by the control system 44. The CVT 20 includes a variator assembly 50 that transfers torque between the CVT input member 37 and the CVT output member 38. The variator assembly 50 includes a first, or primary pulley 52, a second, or secondary pulley 54, and a continuous rotatable device 56, such as a belt or chain, or any flexible continuous rotating device, that rotatably couples the first and second pulleys 52, 54 to transfer torque therebetween. The first pulley 52 and input member 37 rotate about a first axis A, and the second pulley 54 and output member 38 rotate about a second axis B. One of the first and second pulleys 52, 54 may act as a ratioing pulley to establish a speed ratio and the other of the first and second pulleys 52, 54 may act as a clamping pulley to generate sufficient clamping force to transfer torque. As used herein, the term 'speed ratio' refers to a variator speed ratio, which may be a ratio of a CVT output speed and a CVT input speed, which may also be referred to as the transmission gear ratio. Thus, the distance between the first pulley halves 52a, 52b may be varied (by moving one or more of the pulley halves 52a, 52b along the axis A) to move the continuous member 56 higher or lower within the groove defined between the two pulley halves 52a, 52b. Likewise, the second pulley halves 54a, 54b may be moved with respect to each other along the axis B to change the ratio or torque-carrying capacity of the CVT 20. One or both pulley halves 52a, 52b, 54a, 54b of each pulley 52, 54 may be moved with an actuator, such as a hydraulically-controlled actuator that varies the fluid pressure supplied to the pulleys 52, 54.

The motor vehicle propulsion system 12 preferably includes one or more sensors or sensing devices, such as Hall-effect sensors, for monitoring rotational speeds of various devices (not shown), including, e.g., an engine speed sensor, a torque converter turbine speed sensor, a CVT variator input speed sensor, a CVT variator output speed sensor, and one or more wheel speed sensors. Each of the sensors communicates with the control system 44.

Figure 3:
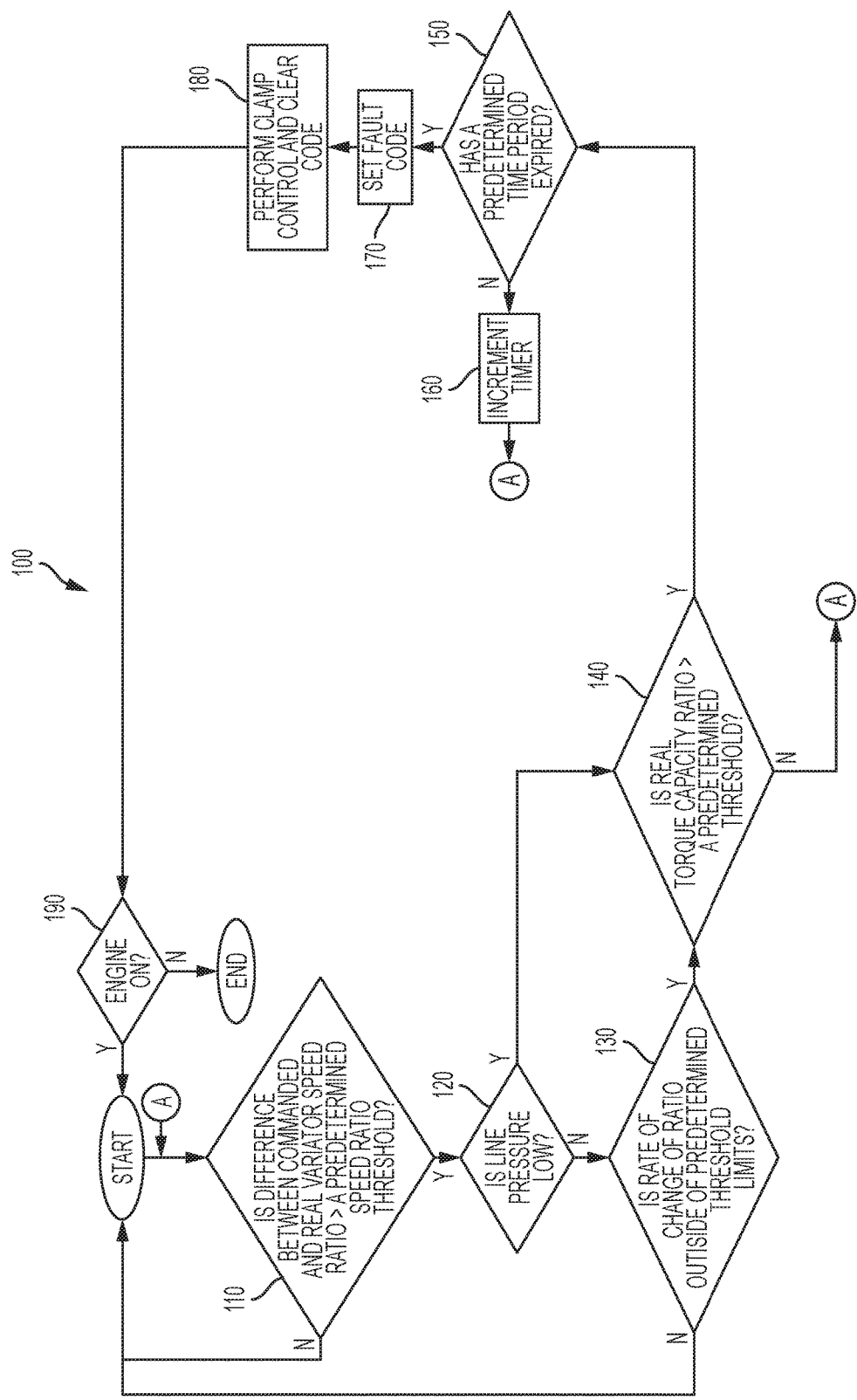
FIG. 3 is an illustration of a method for CVT variator gross slip detection in accordance with aspects of the exemplary embodiment.

Referring now to FIG. 3, an algorithm 100 of a method for CVT variator gross slip detection in accordance with aspects of the exemplary embodiment is provided. The method for CVT variator gross slip detection is provided as a rationality test for checking if a primary detection method of determining gross slip faults in the CVT variator system are being falsely triggered due to hydraulic pressure latency characteristics that can occur within CVT transmissions. It is appreciated that these false triggers can cause unnecessary variator clamping events which in turn may lead to degraded fuel economy if allowed to occur without a mitigation strategy.

At block 110, the method begins with determining if a difference between a commanded variator speed ratio and a real variator speed ratio is greater than a predetermined variator speed ratio threshold. The commanded variator speed ratio is based on, but not limited to, driver input, vehicle load, driving conditions, and other information that can be received by the control system 44 and calculated accordingly. The real variator speed ratio can be determined by using sensing device such as the CVT variator input and output speed sensors mentioned above, however, a measured pulley position could also be used to determine the speed ratio. In accordance with the exemplary embodiment, these sensors are Hall Effect sensors capable of monitoring the rotational speeds of the variator pulleys. If the difference between the between the commanded variator speed ratio and the real variator speed ratio is greater than the predetermined variator speed ratio threshold then the method continues at block 120. If not, then the method repeats at block 110.

At block 120, the method continues with determining if the transmission line pressure is low. It is appreciated that if the transmission line pressure is low then all of the CVT transmission functionality can be adversely affected, particularly transmission functions that are driven by hydraulic pressures within the transmission. If the transmission line pressure is low then the method moves to block 140 discussed below. If the transmission line pressure is not determined to be low then, at block 130, the method continues with the beginning of the rationality test in accordance with the exemplary embodiment. The rationality test includes two additional gross slip detection criteria which must be checked before a gross slip error fault code is set or at least one remedial action is undertaken.

The first criteria checked is determining if a variator rate of change ratio is outside of predetermined variator rate of change ratio limits when the difference between the commanded variator speed (primary pulley/secondary pulley) ratio and the real variator speed ratio is greater than the predetermined variator speed ratio threshold.

Determining if the variator rate of change ratio is outside of predetermined variator rate of change ratio limits includes (when the variator rate of change is negative) determining if the variator rate of change ratio is less than a predetermined rate of change ratio minimum threshold), or, (when the variator rate of change is positive) determining if the variator rate of change is greater than a predetermined rate of change ratio maximum threshold. If it is determined, at block 130, that the variator rate of change ratio is not outside of predetermined variator rate of change limits then the method repeats starting at block 110 which delays the triggering of a pulley pressure error occurring and a fault flag being set until other criteria are indicative of a fault.

Referring back to block 120, if the line pressure is low then the method moves to block 140 bypassing the first criteria of the rationality test. This is done because if the transmission line pressure is low then the condition will adversely affect the results of the two additional rationality tests and, therefore, only one additional criteria at block 140 is checked to determine if a pulley pressure error due to low line pressure exists as opposed to an error being due to gross slip.

Referring again to block 130, if it is determined that the variator rate of change ratio is outside of predetermined variator rate of change ratio limits then, at block 140, the method continues with the second criteria of the rationality test by determining if a real torque capacity ratio is greater than a predetermined torque capacity ratio threshold when the difference between the commanded variator speed ratio and the real variator speed ratio is greater than the predetermined variator speed ratio threshold. The real torque capacity ratio is calculated by the controller system based on engine torque at the variator system input and actual variator clamping torque capacity measured at the variator system output. The controller system determines if the real torque capacity ratio signal is valid prior to checking if the real torque capacity ratio is greater than the predetermined torque ratio threshold. If the controller system determines the real torque capacity ration signal to be invalid then the method moves to block 150. If the real torque capacity ratio is not greater than a predetermined torque capacity ratio threshold then the method repeats from block 110 again delaying the triggering of a pulley pressure error until additional criteria indicative of gross slip fault occurs.

If the real torque capacity ratio is greater than a predetermined torque capacity ratio threshold then, at block 150, the method continues with determining if a predetermined time period has expired after the two additional criteria for the rationality test indicate that a pulley pressure fault is present for causing gross slip events. If the predetermined time period has not expired then at block 160, the timer is incremented and the method repeats at block 110.

If the predetermined time period has expired then the method continues at block 170 with performing at least one remedial action when the variator rate of change ratio is outside of predetermined variator rate of change ratio limits, and the real torque capacity ratio is greater than the predetermined torque capacity ratio threshold when the difference between the commanded variator speed ratio and the real variator speed ratio is greater than the predetermined variator speed ratio threshold. In this case, the first action is setting fault code/flag indicative of gross slip detection, and further at block 180 with adjusting variator clamping via the control system to eliminate gross slip.

At block 190, the method continues with determining if the engine is still on. If so the method for CVT variator gross slip detection repeats until the vehicle in turned off.

The detailed description and the drawings or figures are supportive and descriptive of the disclosure, but the scope of the disclosure is defined solely by the claims. While some examples for carrying out the claimed disclosure have been described in detail, various alternative designs and examples exist for practicing the disclosure defined in the appended claims. Furthermore, the examples shown in the drawings or the characteristics of various examples mentioned in the present description are not necessarily to be understood as examples independent of each other. Rather, it is possible that each of the characteristics described in one of the examples of an example can be combined with one or a plurality of other desired characteristics from other examples, resulting in other examples not described in words or by reference to the drawings. Accordingly, such other examples fall within the framework of the scope of the appended claims.

What is claimed is:

1. A method for continuous variable transmission (CVT) variator gross slip detection comprising:
   determining if a difference between a commanded variator speed ratio and a real variator speed ratio is greater than a predetermined variator speed ratio threshold;
   determining if a variator rate of change ratio is outside of predetermined variator rate of change ratio limits when the difference between the commanded variator speed ratio and the real variator speed ratio is greater than the predetermined variator speed ratio threshold;
   determining if a real torque capacity ratio is greater than a predetermined torque capacity ratio threshold when the difference between the commanded variator speed ratio and the real variator speed ratio is greater than the predetermined variator speed ratio threshold; and
   adjusting variator clamping to eliminate gross slip when the variator rate of change ratio is outside of the predetermined variator rate of change ratio limits, and the real torque capacity ratio is greater than the predetermined torque capacity ratio threshold when the difference between the commanded variator speed ratio and the real variator speed ratio is greater than the predetermined variator speed ratio threshold.

2. The method of claim 1 further comprising determining if the real torque capacity ratio is valid prior to determining if the real torque capacity ratio is greater than the predetermined torque capacity ratio threshold.

3. The method of claim 1 wherein determining if the difference between the commanded variator speed ratio and the real variator speed ratio is greater than the predetermined variator speed ratio threshold further comprises using a CVT variator input speed sensor and a variator output speed sensor.

4. The method of claim 3 wherein using the CVT variator input speed sensor and the variator output speed sensor further comprises using Hall Effect sensors.

5. The method of claim 1 wherein determining if the variator rate of change ratio is outside of the predetermined variator rate of change ratio limits further comprises determining if the variator rate of change ratio is less than a predetermined rate of change ratio minimum threshold or greater than a predetermined rate of change ratio maximum threshold.

6. The method of claim 1 further comprising waiting until a predetermined time period has expired prior to the adjusting variator clamping to eliminate gross slip when the variator rate of change ratio is outside of the predetermined variator rate of change ratio limits, and the real torque capacity ratio is greater than the predetermined torque capacity ratio threshold when the difference between the commanded variator speed ratio and the real variator speed ratio is greater than the predetermined variator speed ratio threshold.

7. The method of claim 1 further comprising calculating the real torque capacity ratio based on an engine torque and a variator clamping torque capacity.

8. A method for continuous variable transmission (CVT) variator gross slip detection comprising:
   determining if a difference between a commanded variator speed ratio and a real variator speed ratio is greater than a predetermined variator speed ratio threshold;
   determining if a variator rate of change ratio is less than a predetermined rate of change ratio minimum threshold or greater than a predetermined rate of change ratio maximum threshold when the difference between the commanded variator speed ratio and the real variator speed ratio is greater than the predetermined variator speed ratio threshold;
   determining if a real torque capacity ratio is greater than a predetermined torque capacity ratio threshold when the difference between the commanded variator speed ratio and the real variator speed ratio is greater than the predetermined variator speed ratio threshold; and
   adjusting variator clamping to eliminate gross slip when the variator rate of change ratio is outside of the predetermined rate of change ratio minimum threshold and the predetermined rate of change ratio maximum threshold, and the real torque capacity ratio is greater than the predetermined torque capacity ratio threshold when the difference between the commanded variator speed ratio and the real variator speed ratio is greater than the predetermined variator speed ratio threshold.

9. The method of claim 8 further comprising determining if the real torque capacity ratio signal is valid prior to determining if the real torque capacity ratio is greater than the predetermined torque capacity ratio threshold.

10. The method of claim 8 wherein determining if the difference between the commanded variator speed ratio and the real variator speed ratio is greater than the predetermined variator speed ratio threshold further comprises using a CVT variator input speed sensor and a variator output speed sensor.

11. The method of claim 10 wherein using the CVT variator input speed sensor and the variator output speed sensor further comprises using Hall Effect sensors.

12. The method of claim 8 further comprising waiting until a predetermined time period has expired prior to the adjusting variator clamping to eliminate gross slip.

13. The method of claim 8 further comprising calculating the real torque capacity ratio based on an engine torque and a variator clamping torque capacity.

14. A method for continuous variable transmission (CVT) variator gross slip detection comprising:

determining if a difference between a commanded variator speed ratio and a real variator speed ratio is greater than a predetermined variator speed ratio threshold;

determining if a variator rate of change ratio is less than a predetermined rate of change ratio minimum threshold or greater than a predetermined rate of change ratio maximum threshold when the difference between the commanded variator speed ratio and the real variator speed ratio is greater than the predetermined variator speed ratio threshold;

determining if a real torque capacity ratio is greater than a predetermined torque capacity ratio threshold when the difference between the commanded variator speed ratio and the real variator speed ratio is greater than the predetermined variator speed ratio threshold; and adjusting variator clamping to eliminate gross slip by setting a fault code for gross slip when the variator rate of change ratio is outside of the predetermined rate of change ratio minimum threshold and the predetermined rate of change ratio maximum threshold, and the real torque capacity ratio is greater than a predetermined torque capacity ratio threshold when the difference between the commanded variator speed ratio and the real variator speed ratio is greater than the predetermined variator speed ratio threshold.

* * * * *